(12) United States Patent
Suzuki

(10) Patent No.: US 9,602,723 B2
(45) Date of Patent: Mar. 21, 2017

(54) IMAGING APPARATUS CAPABLE OF CONTROLLING POWER CONSUMPTION AND ACCESS TO MEMORY AND CONTROL METHOD THEREOF

(71) Applicant: CANON KABUSHIKI KAISHA, Tokyo (JP)

(72) Inventor: Soichiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 14/579,399

(22) Filed: Dec. 22, 2014

(65) Prior Publication Data

US 2015/0181118 A1 Jun. 25, 2015

(30) Foreign Application Priority Data

Dec. 25, 2013 (JP) ................. 2013-268085

(51) Int. Cl.
*H04N 5/232* (2006.01)
*H04N 1/00* (2006.01)
*H04N 5/376* (2011.01)

(52) U.S. Cl.
CPC ..... *H04N 5/23241* (2013.01); *H04N 1/00904* (2013.01); *G03B 2217/007* (2013.01); *H04N 5/23245* (2013.01); *H04N 5/3765* (2013.01)

(58) Field of Classification Search
None
See application file for complete search history.

(56) References Cited

U.S. PATENT DOCUMENTS

| | | | |
|---|---|---|---|
| 2002/0003574 A1* | 1/2002 | Kawamura | H04N 1/32561 348/222.1 |
| 2008/0197703 A1* | 8/2008 | Tomita | G06F 1/3203 307/31 |
| 2013/0162873 A1* | 6/2013 | Sengoku | H04N 5/335 348/294 |
| 2014/0108848 A1* | 4/2014 | Okada | G06F 1/3237 713/501 |

FOREIGN PATENT DOCUMENTS

JP   2003-099149 A   4/2003
JP   2006-236059 A   9/2006

* cited by examiner

*Primary Examiner* — Justin P Misleh
(74) *Attorney, Agent, or Firm* — Cowan, Liebowitz & Latman, P.C.

(57) ABSTRACT

This invention makes it possible to increase the image processing speed and reduce the power consumption at the same time by controlling power supply to each processing circuit with a simple control arrangement. To achieve this, when displaying or recording a captured image, a plurality of processing circuits are allowed to equally access a DRAM. When a captured image is displayed to be confirmed in a non-recording mode, power is supplied to an image developing unit with high power consumption in one of two sections obtained by dividing a display frame interval so as to concentrate memory access in the section, and power supply to the image developing unit is stopped upon the end of processing.

12 Claims, 15 Drawing Sheets

F I G. 7
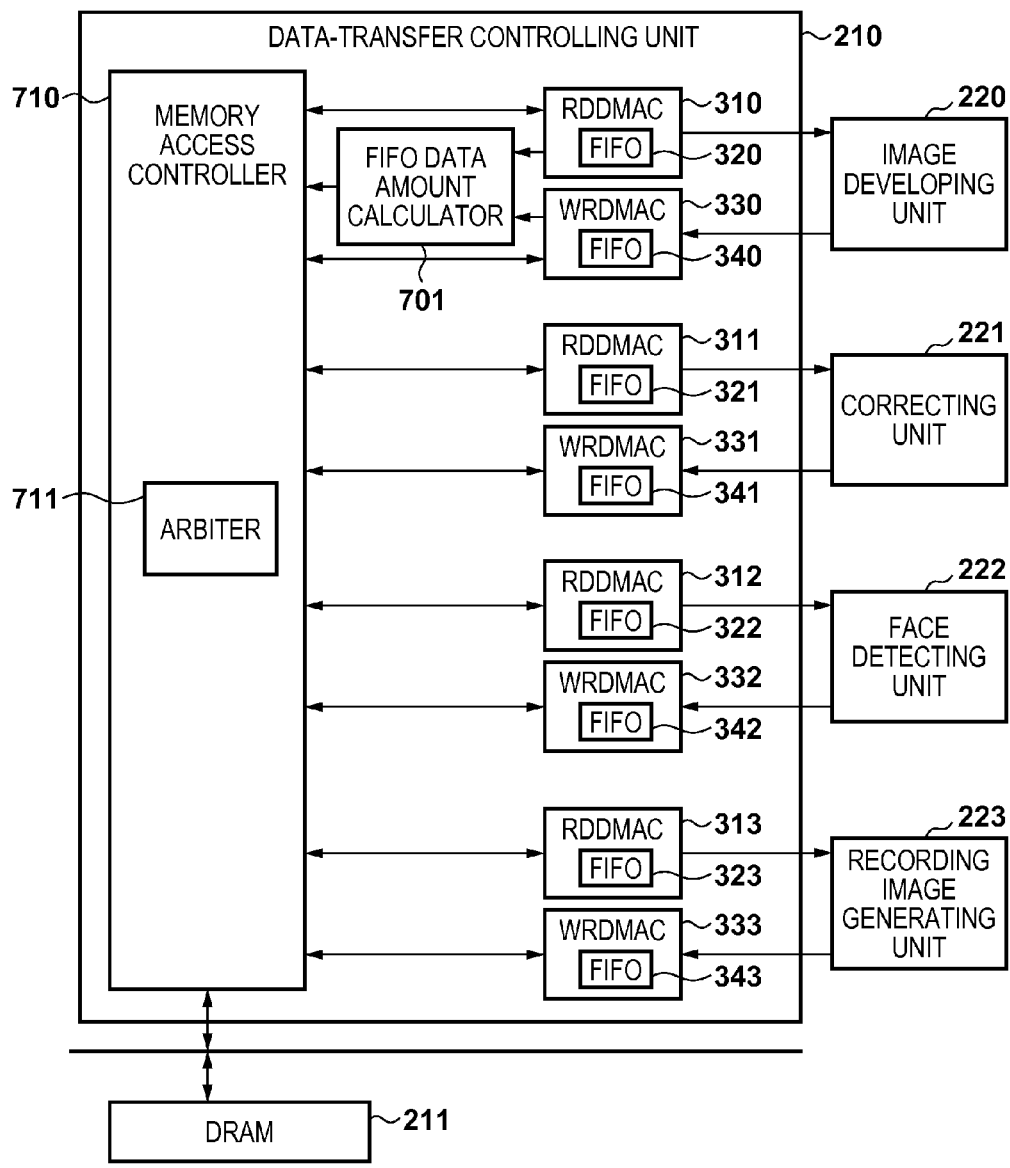

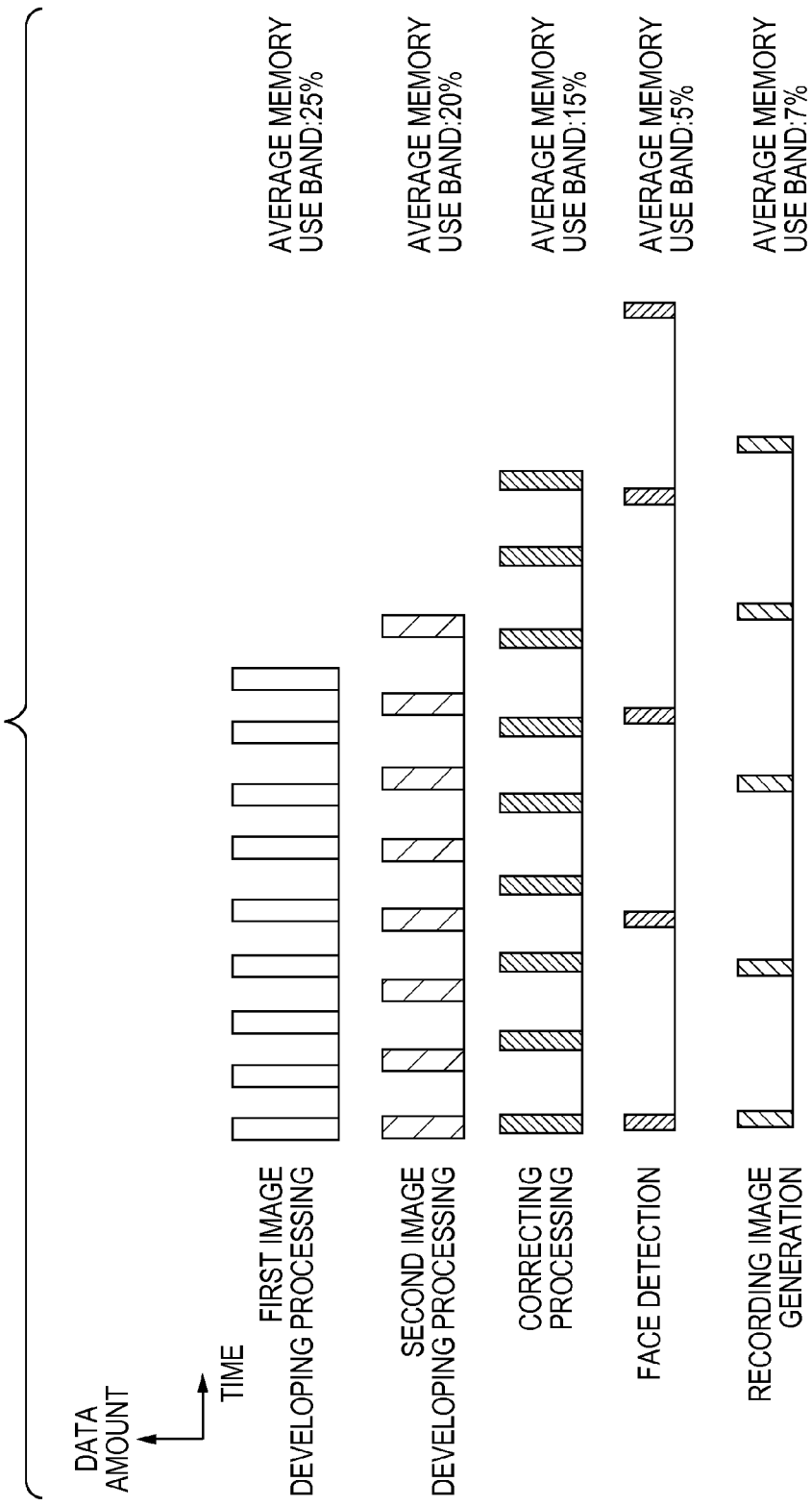

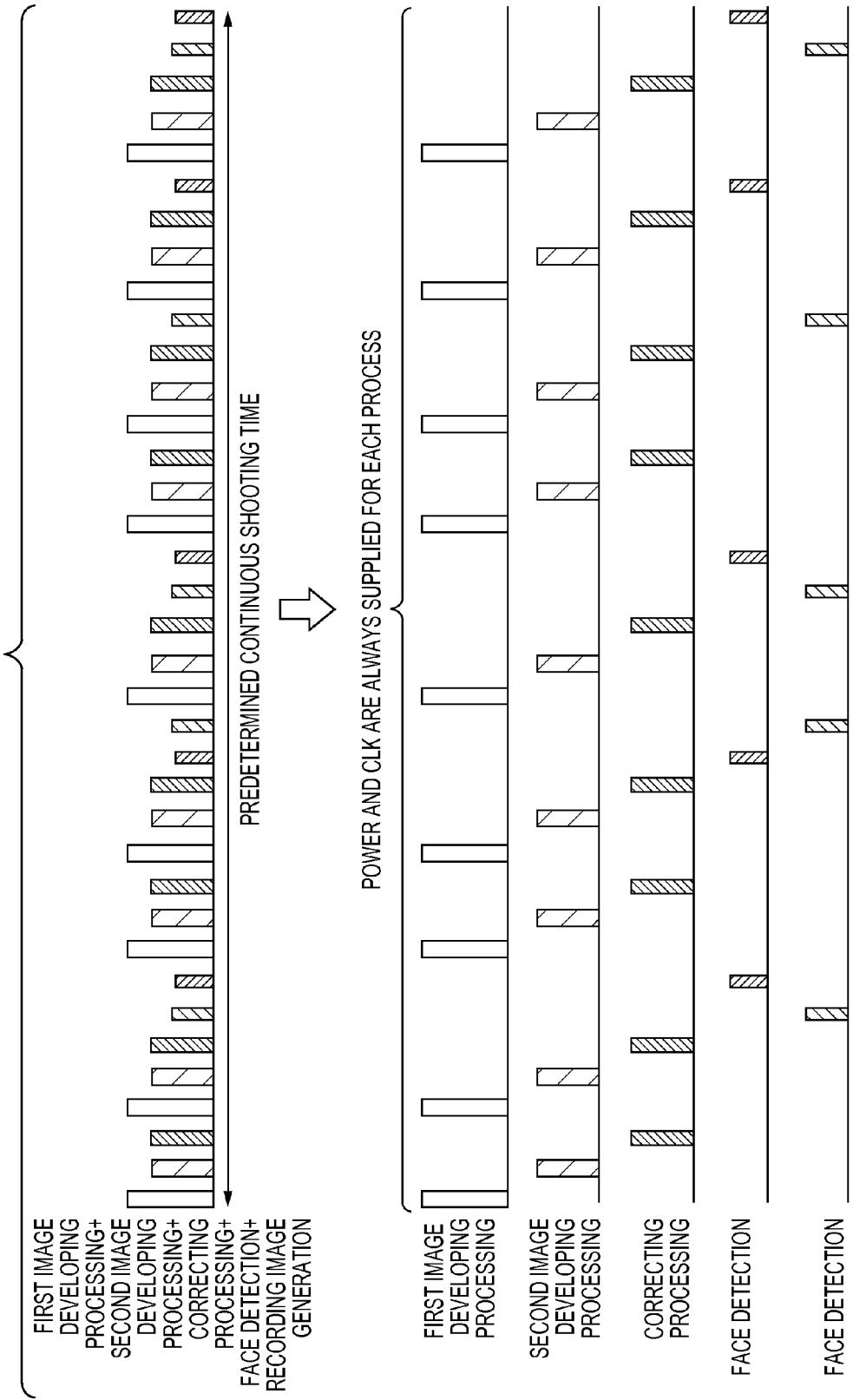

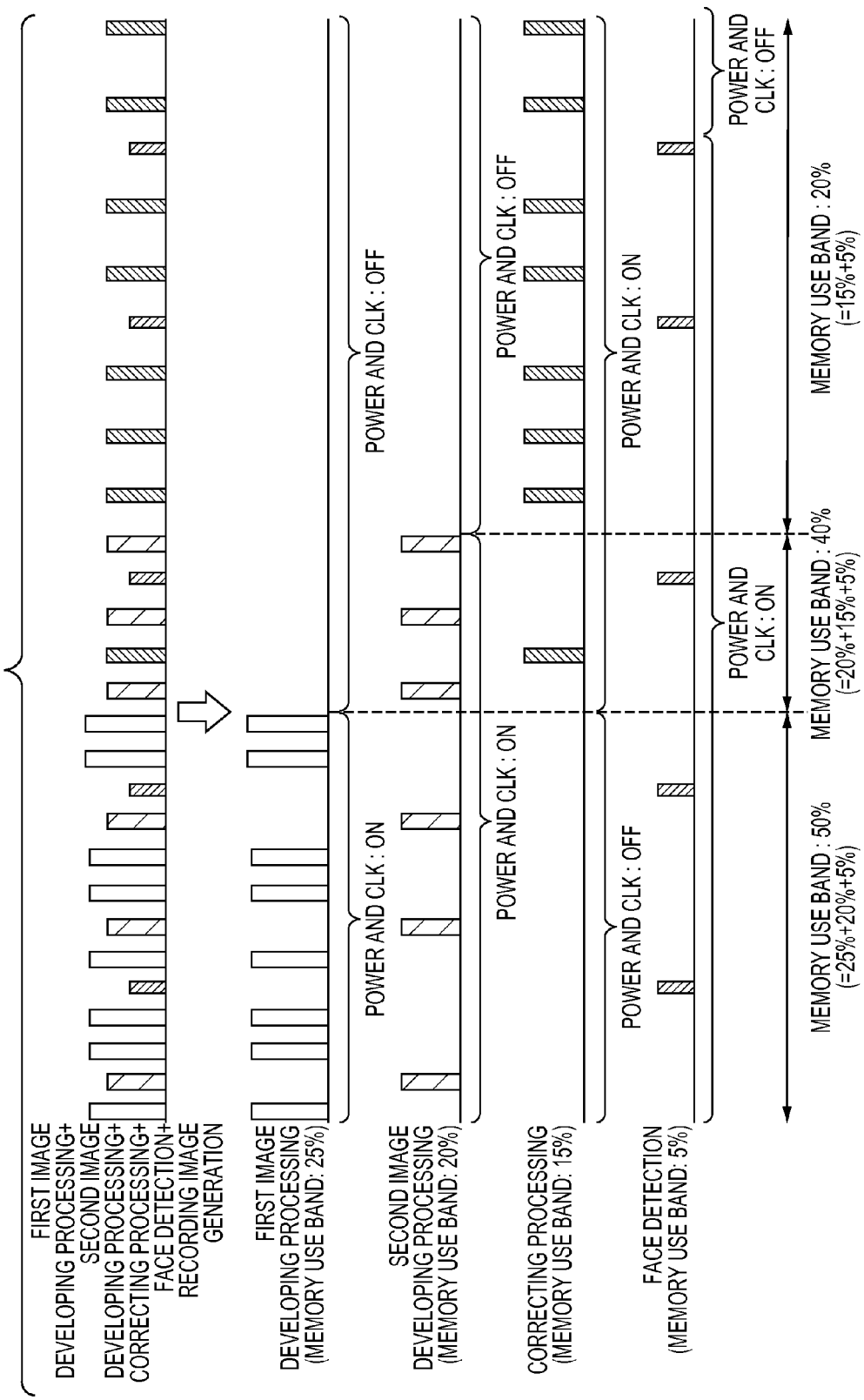

F I G. 14A
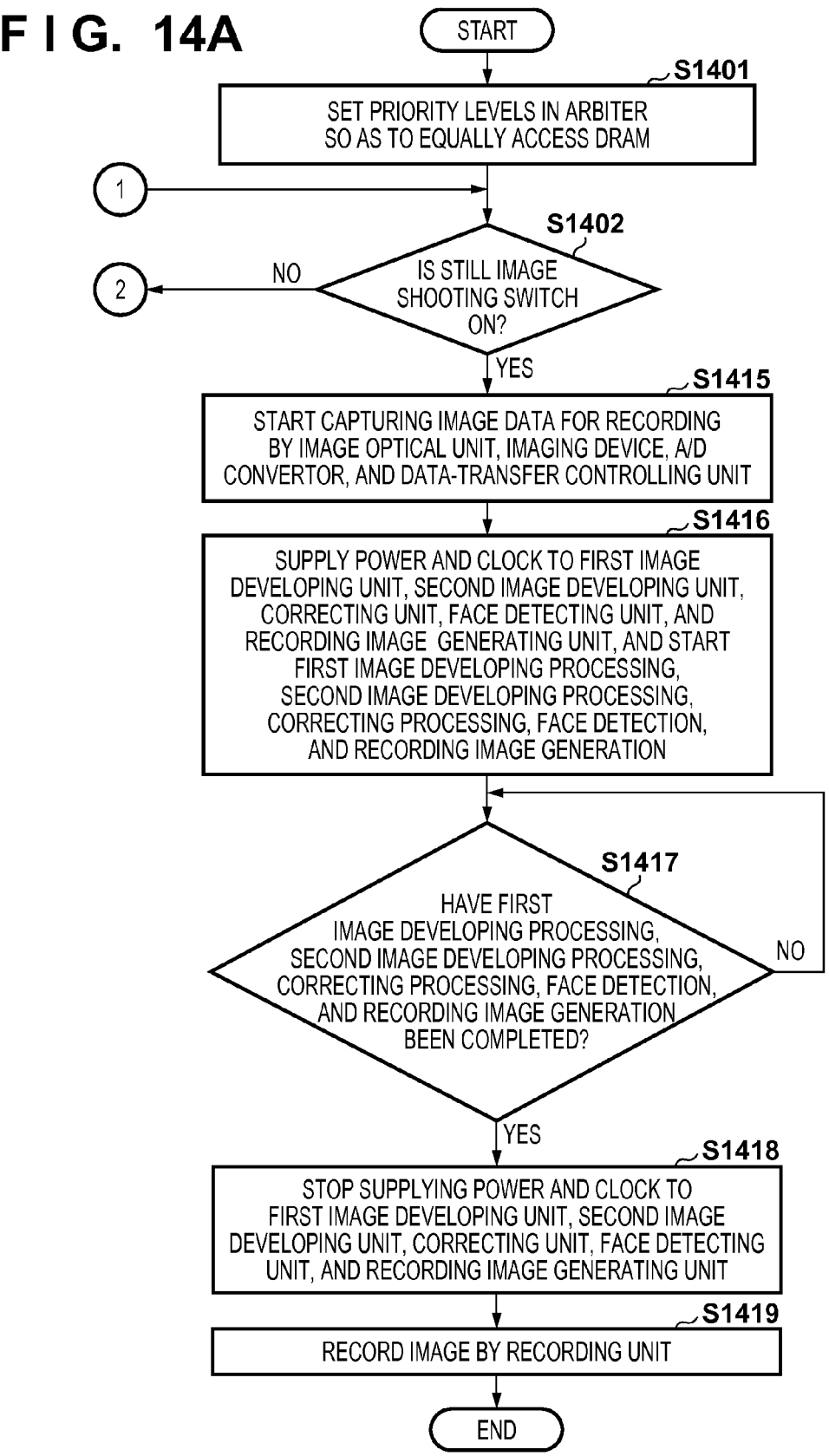

IMAGING APPARATUS CAPABLE OF CONTROLLING POWER CONSUMPTION AND ACCESS TO MEMORY AND CONTROL METHOD THEREOF

BACKGROUND OF THE INVENTION

Field of the Invention

The present invention relates to an image processing technique of recording, in a recording apparatus, an image obtained by imaging, and performing display processing on a display device.

Description of the Related Art

In recent years, in an image processing apparatus having an imaging function such as a digital camera, processing data at a higher speed becomes more important along with an increase in processing data amount caused by a higher resolution of an image, an increase in the number of still image frames in continuous shooting, and improvement of moving image frame rates. On the other hand, however, processing a large amount of image data at a high speed increases the power consumption of an image processing apparatus, and thus increasing the data processing speed while reducing the power consumption is a big issue. Since a digital camera or a portable terminal having the imaging function is operated by a battery, there is demand for the number of recordable images to be increased while reducing the power consumption. To satisfy this requirement, it is especially important to suppress the power consumption as low as possible at the time of displaying a captured image on a monitor before recording the image.

There are conventionally known various techniques of attempting to increase the data processing speed while reducing the power consumption. Japanese Patent Laid-Open No. 2003-99149 describes a technique of attempting to increase the data processing speed while reducing the power consumption by stopping supply of a clock to a data-transfer controlling unit while standing by for permission of memory access. Furthermore, Japanese Patent Laid-Open No. 2006-236059 describes a technique of attempting to increase the data processing speed while reducing the power consumption by setting the minimum clock frequency corresponding to the number of clocks necessary for data transfer.

The above-described conventional techniques, however, are effective to optimize the number of clocks and the clock frequency but do not consider optimization of power supply, and need to continuously supply power to each data processing circuit during data transfer. This is because if power supply is stopped for each data transfer operation, the data processing speed largely decreases, since a power-up sequence requires several hundred µsec or longer for a general data transfer interval of several tens of nsecs to several µsec of a data processing apparatus. Also, if power supply to each data processing circuit is stopped, setting value information set by a CPU or the like in the data processing circuit is also lost. Therefore, if power supply is stopped for each data transfer operation, a reset time is required every time, thereby largely decreasing the data processing speed. In addition, a data transfer control sequence is complicated. In the above-described conventional techniques, a clock control arrangement is also complicated.

SUMMARY OF THE INVENTION

The present invention has been made in consideration of the above problems, and provides a technique capable of attempting to increase the data processing speed while reducing the power consumption by appropriately controlling power supply and clock supply to each data processing circuit with a simple control arrangement.

According to an aspect of this disclosure, there is provided an imaging apparatus comprising: a memory; a plurality of image processing units each configured to process image data, and access the memory; a recording unit configured to record image data processed by the image processing units in a recording medium; a setting unit configured to set one of a plurality modes including a first mode in which an image associated with image data of a plurality of frames processed by the plurality of image processing units is displayed by a display device without recording the image data by the recording unit, and a second mode in which the recording unit records the image data; a memory controlling unit configured to control access to the memory in accordance with the mode set by the setting unit; and a power controller configured to control power supply to the plurality of image processing units, wherein the memory controlling unit controls the remaining image processing units other than a predetermined one of the plurality of image processing units not to access the memory during a period from a start to end of processing of image data of one frame by the predetermined image processing unit, and the power controller stops power supply to the predetermined image processing unit during a period from when the predetermined image processing unit ends the processing of the image data of the one frame until processing of a next frame is performed in the first mode.

According to the present invention, it is possible to optimally control supply of power and a clock to a data processing circuit, and perform recording of image data in a recording apparatus and display control on a display device while increasing the data processing speed and reducing the power consumption at the same time.

Further features of the present invention will become apparent from the following description of exemplary embodiments (with reference to the attached drawings).

BRIEF DESCRIPTION OF THE DRAWINGS

FIG. 7 is a block diagram showing the arrangement of a data-transfer controlling unit according to the second embodiment;

FIG. 11 is a view showing the DRAM access pattern of each image processing unit at the time of an individual operation according to the third embodiment;

FIG. 12 is a view showing the DRAM access pattern of each image processing unit at the time of image recording according to the third embodiment;

FIG. 13 is a view showing the DRAM access pattern of each image processing unit at the time of image display according to the third embodiment; and FIGS. 14A and 14B are flowcharts illustrating an image display/recording processing procedure according to the third embodiment.

DESCRIPTION OF THE EMBODIMENTS

Embodiments of the present invention will be described in detail below with reference to the accompanying drawings.

First Embodiment

Figure 2:
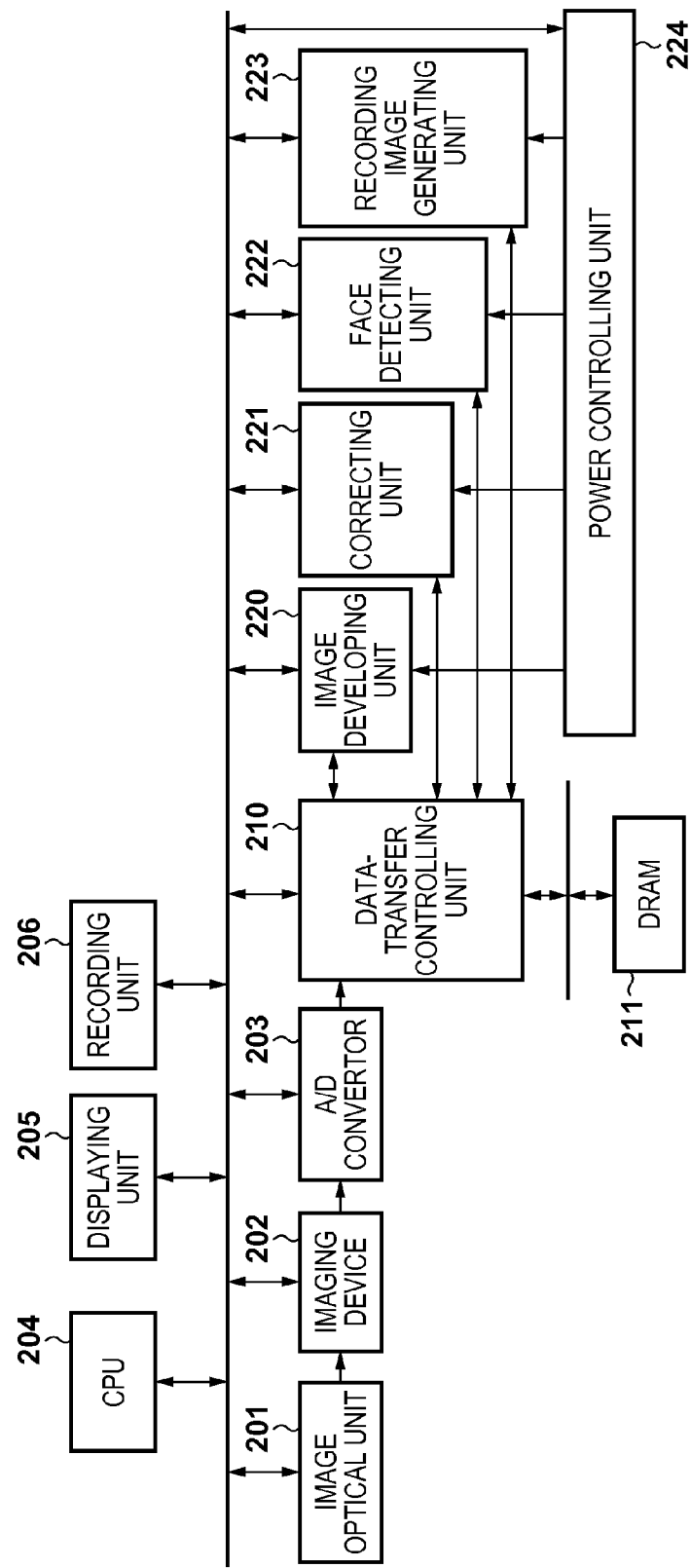
FIG. 2 is a block diagram showing the arrangement of an image processing apparatus according to the first or second embodiment.

The first embodiment of the present invention will be explained. FIG. 2 is a block diagram showing the arrangement of an image processing apparatus applied in the first embodiment. The image processing apparatus shown in FIG. 2 is a digital camera or an apparatus having the imaging function.

Referring to FIG. 2, reference numeral 201 denotes an image optical unit formed from a lens, a stop, and the like, which performs focus adjustment and exposure adjustment; 202, an imaging device such as a CCD which converts an optical image into an electrical signal; 203, an A/D convertor which converts an analog image signal from the imaging device 202 into digital image data; 210, a data-transfer controlling unit which writes/reads image data and various control data in/from a DRAM 211; 204, a CPU which performs various control operations via a bus; 220, an image developing unit which converts image data into image data that is formed from luminance/color difference information and the like and is displayable on a general display device; 221, a correcting unit which performs processing such as optical distortion correction for image data; 222, a face detecting unit which detects the face of a person from image data, and feeds back a face detection result to the imaging device 202 as a focus adjustment value and exposure adjustment value; and 223, a recording image generating unit which converts image data into a general recording image format such as JPEG. Each of the image processing units 220 to 223 of the first embodiment reads out image data from the DRAM 211, and writes a result of performing image processing for the image data in the DRAM 211. Reference numeral 205 denotes a displaying unit formed from a liquid crystal monitor or the like, which displays image data; 206, a recording unit which records image data in a recording medium (not shown); and 224, a power controlling unit which controls supply of a clock and power (a battery is not shown) to each of the image processing units 220 to 223 in accordance with an instruction of the CPU 204, and is configured to independently control supply of a clock and power to each of the image processing units 220 to 223.

Figure 3:
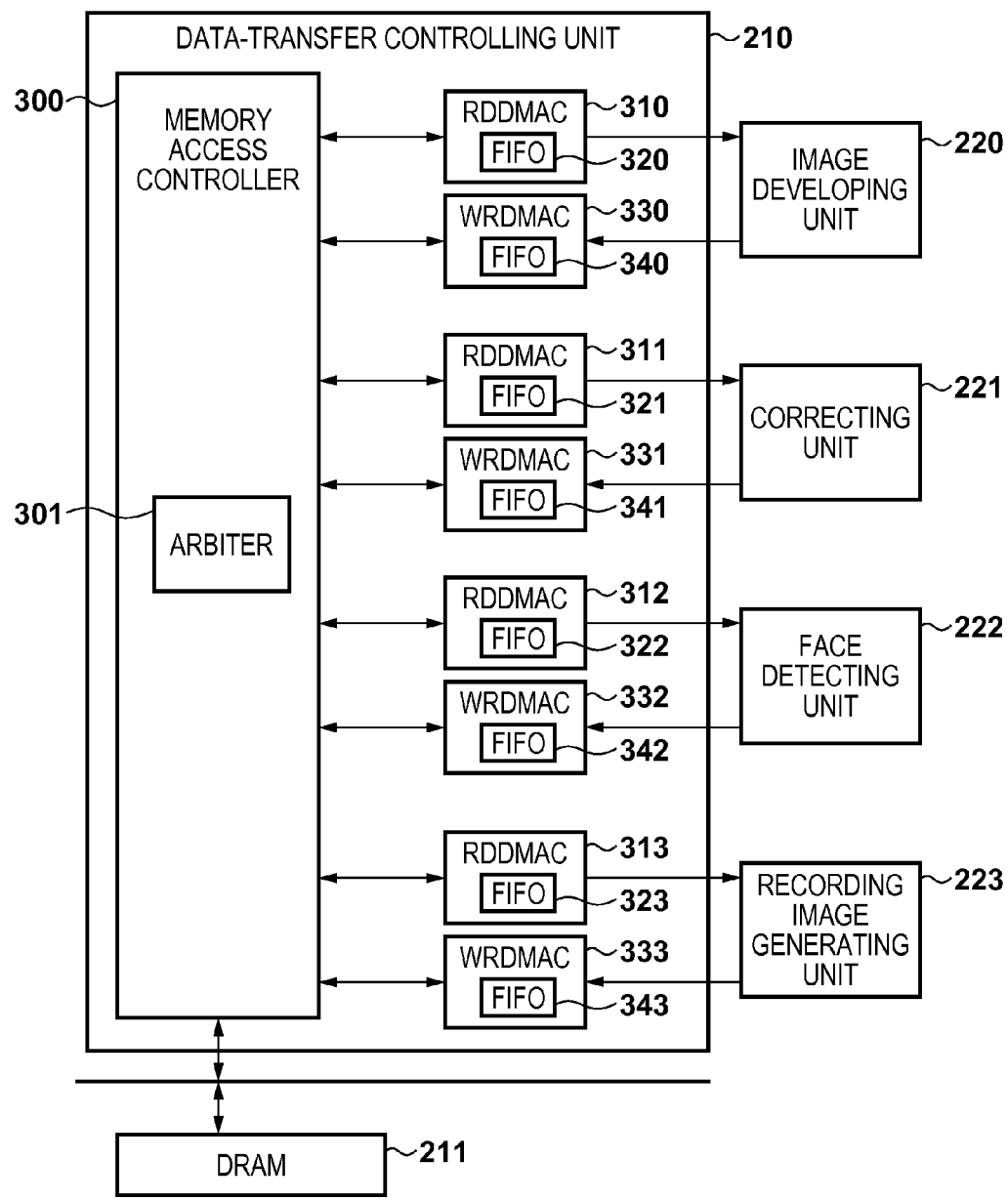
FIG. 3 is a block diagram showing the arrangement of a data-transfer controlling unit according to the first or third embodiment.

FIG. 3 is a block diagram showing the arrangement of the data-transfer controlling unit 210 according to the first embodiment. Reference numerals 310 to 313 denote RDDMACs (Read Direct Memory Access Controllers) which respectively control transfer of image data read out from the DRAM 211 into the image processing units 220 to 223. The RDDMACs 310 to 313 include FIFOs 320 to 323 for temporarily storing image data, respectively. Reference numerals 330 to 333 denote WRDMACs (Write Direct Memory Access Controllers) which respectively control transfer of image data written by the image processing units 220 to 223 in the DRAM 211. The WRDMACs 330 to 333 include FIFOs 340 to 343 for temporarily storing image data, respectively. Reference numeral 300 denotes a memory access controller which controls transfer for reading out image data from the DRAM 211 and for writing image data in the DRAM 211 in response to requests of the RDDMACs 310 to 313 and the WRDMACs 330 to 333. Reference numeral 301 denotes an arbiter which controls access priority levels when the RDDMACs 310 to 313 and the WRDMACs 330 to 333 simultaneously request to access the DRAM 211.

Figure 4:
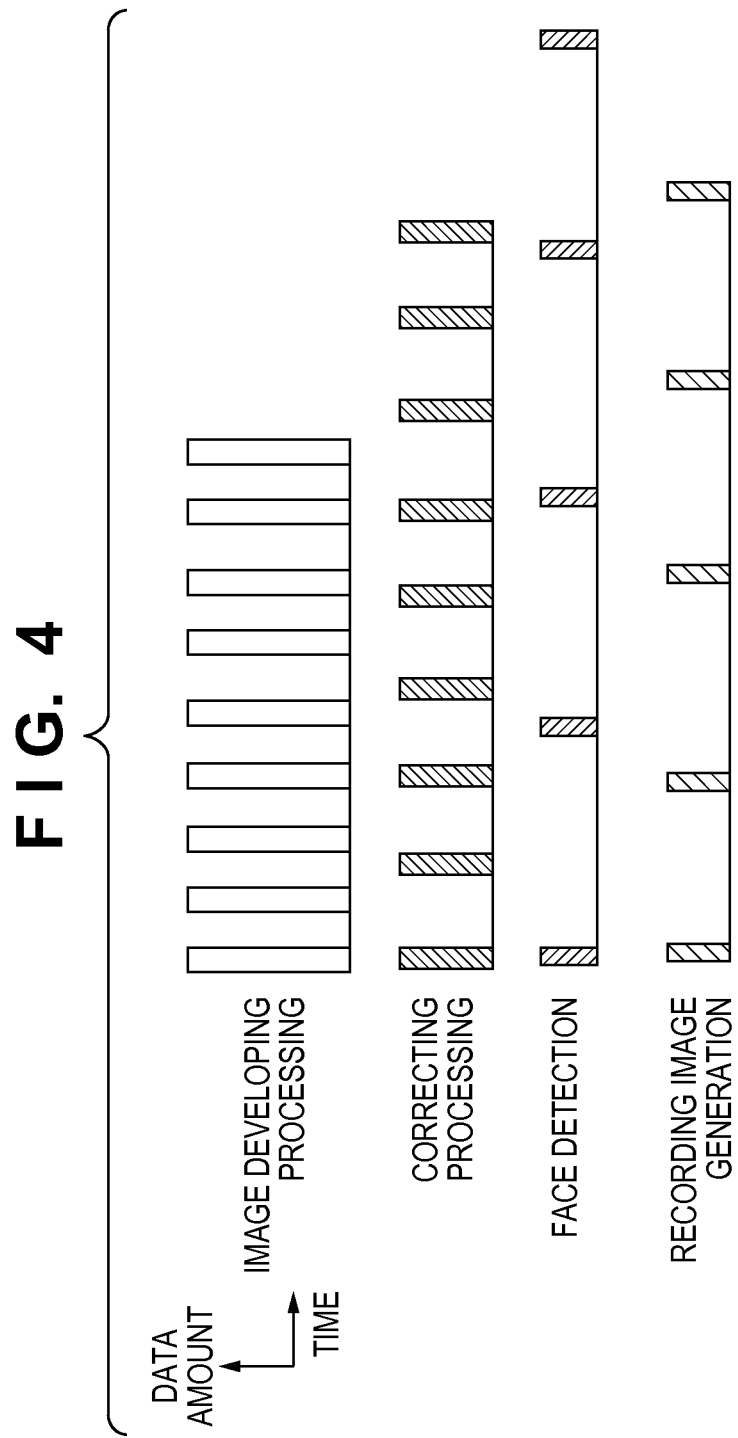
FIG. 4 is a view showing the DRAM access pattern of each image processing unit at the time of an independent operation according to the first or second embodiment.

FIG. 4 is a view showing a data amount and an access time to the DRAM 211 when each of the image processing units 220 to 223 independently processes image data of one frame according to the first embodiment. In this embodiment, the image developing unit 220 processes a large amount of data at a high speed, as compared with the remaining image processing units. Therefore, the image developing unit 220 accesses the DRAM 211 to read/write a large amount of data at a short interval, and thus the image processing completion time and the access completion time to the DRAM 211 are short, as compared with the remaining image processing units. In general, the power consumption of a circuit capable of processing a large amount of data at a high speed is high. In this embodiment, the power consumption of the image developing unit 220 is also higher than those of the remaining image processing units.

Figure 5:
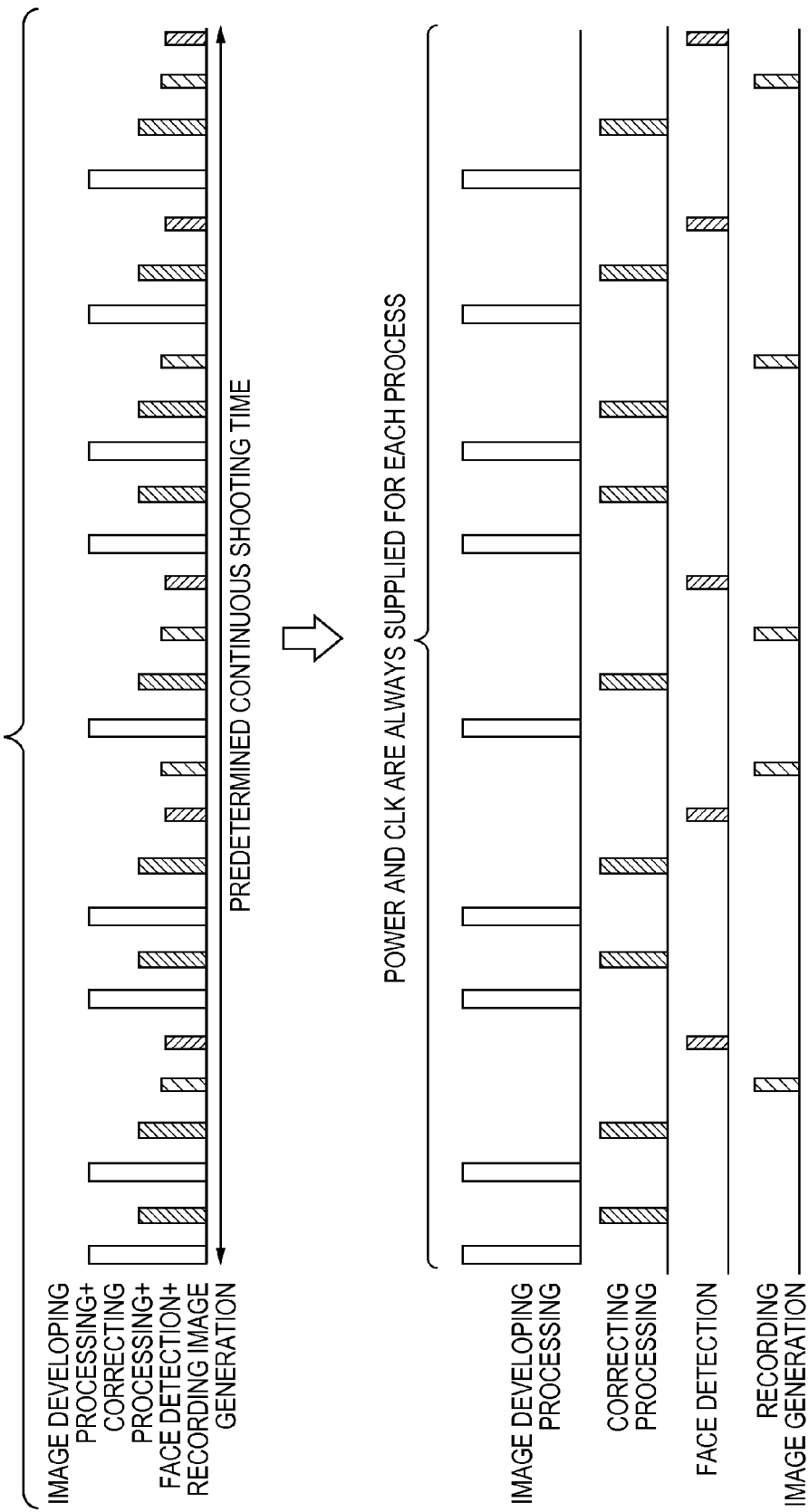
FIG. 5 is a view showing the DRAM access pattern of each image processing unit at the time of image recording according to the first or second embodiment.

FIG. 5 is a view showing the access pattern of the DRAM 211 of each of the image processing units 220 to 223 at the time of processing image data of one frame and executing processing of recording the image data in the recording unit 206 in the still image continuous shooting/recording mode of the image processing apparatus according to the first embodiment. An image size to be processed by each of the image processing units 220 to 223 at the time of still image continuous shooting/recording is large. For each frame shot in the continuous shooting/recording mode, all the processes of the image processing units 220 to 223 need to be completed within a predetermined continuous shooting time. Assume that an image size processed at the time of image continuous shooting/recording according to this embodiment is 4,000 pixels in the horizontal direction and 3,000 pixels in the vertical direction, and the predetermined continuous shooting time within which the processes for one frame are completed is 150 milliseconds (msec). If access to the DRAM 211 by specific processing is prioritized, the remaining processes are delayed, thereby disabling all the processes from being completed within the predetermined continuous shooting time. In this embodiment, therefore, access priority levels are set in the arbiter 301 so that all the processing units equally access the DRAM 211 within the predetermined continuous shooting time. At this time, since the image processing units 220 to 223 always operate during the predetermined continuous shooting time, power and a clock are always supplied to each of the image processing units 220 to 223. Since each of the image processing units 220 to 223 of this embodiment reads out data from the DRAM 211, and writes a processing result in the DRAM 211, it is possible to flexibly control the processing completion time of each of the image processing units 220 to 223 by changing the access priority levels to the DRAM 211. As described above, each of the image processing units 220 to 223 can process a large amount of image data within the predetermined continuous shooting time and record images in the recording unit 206 by allowing all the processes to equally access the DRAM 211.

Figure 1:
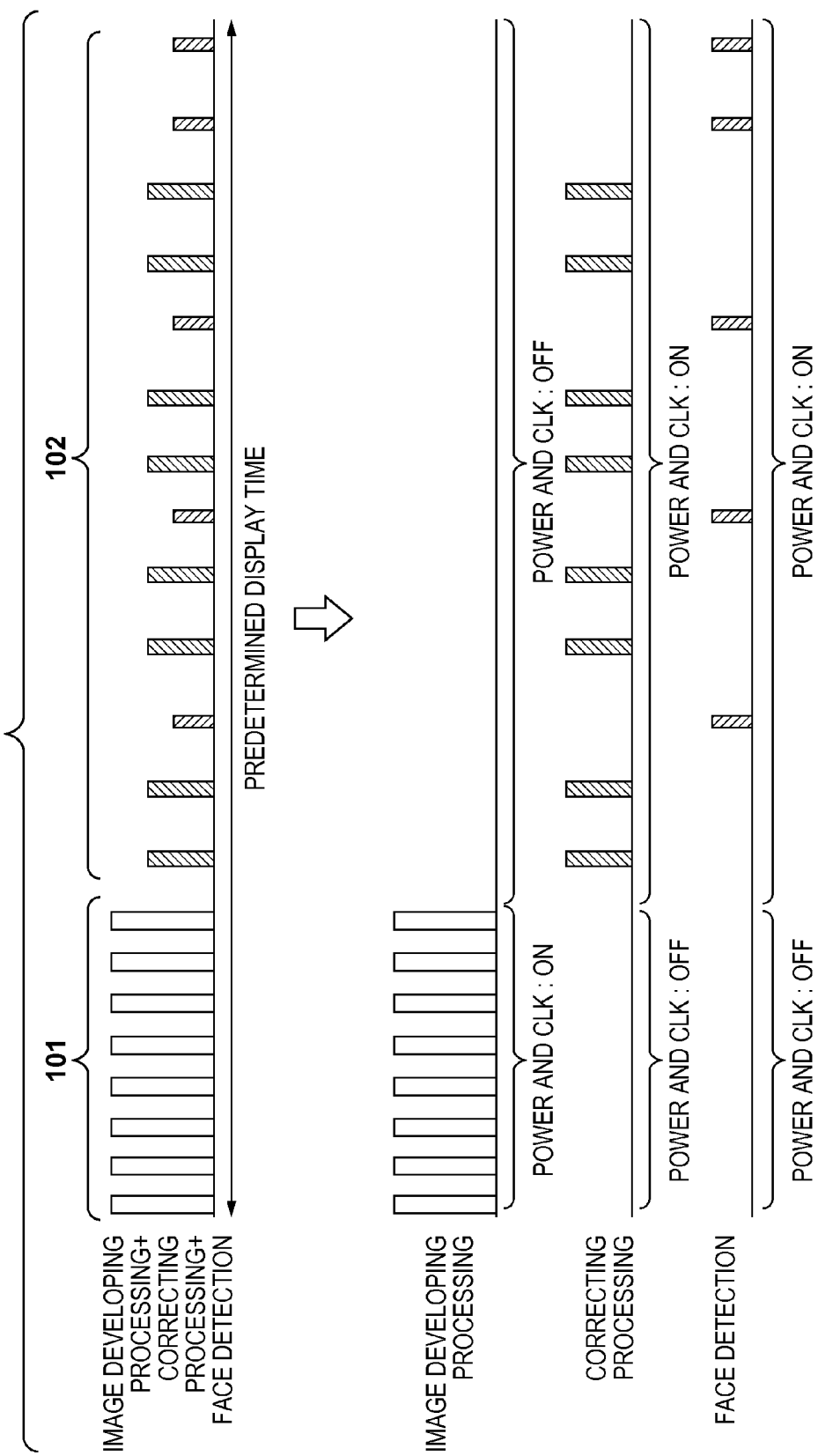
FIG. 1 is a view showing the DRAM access pattern of each image processing unit at the time of image display according to the first embodiment.

FIG. 1 is a view showing the access pattern of the DRAM 211 of each of the image processing units 220 to 222 when processing the image data of one frame and displaying it on the displaying unit 205 before recording an image in the recording medium in the image processing apparatus according to the first embodiment. As for a digital camera, even if a shutter button is not pressed, the apparatus enters a recording standby state or non-recording state in which a moving image of an object being captured is displayed on the displaying unit to confirm the moving image. In FIG. 1, it will be easily understood that the access pattern of the DRAM 211 of each of the image processing units 220 to 222 indicates such state.

It is necessary to complete each process for image data of one frame within a predetermined display time at the time of image display in the standby state. Note that the image size (the number of pixels) to be processed in an image non-recording state (recording standby mode) need only be equal to or smaller than a size displayable on the displaying unit 205, and is smaller than that at the time of still image continuous shooting/recording. In this embodiment, assume that the image size to be processed at the time of image display is 640 pixels in the horizontal direction and 480 pixels in the vertical direction, and the predetermined display time (frame interval) within which processing for one frame is completed is 30 msec. In the image non-recording state, since the recording unit 206 need not record an image, it is not necessary to operate the recording image generating unit 223. Therefore, the difference between the processing completion time of each of the image processing units 220 to 222 and the predetermined time at the time of image display is longer than that between the processing completion time of each of the image processing units 220 to 223 and the predetermined time at the time of still image continuous shooting/recording. In this embodiment, in part (a first section 101) of the predetermined display time at the time of image display in the image non-recording state, the CPU 204 operates the image developing unit 220 by supplying power (turning on the power supply), and stops supply of power and a clock (turns off the power supply) without operating the remaining image processing units 221 and 222. In the remaining part (a second section 102) of the predetermined display time, power and a clock are supplied to the remaining processing units.

That is, when the image developing unit 220 completes processing of image data of one frame in the first section 101 of the predetermined display time, the CPU 204 stops supplying the power and clock to the image developing unit 220 in the second section 102. In the first section 101, the CPU 204 stops supplying the power and clock to each of the correcting unit 221 and face detecting unit 222. In the second section 102, the CPU 204 causes each of the correcting unit 221 and face detecting unit 222 to start processing by supplying power and a clock. Since the data processing speed of the image developing unit 220 of this embodiment at the time of an independent operation is high, the operation period of the image developing unit 220 within the predetermined display time is short, thereby prolonging the stop period. Assume that the stop period of the image developing unit 220 of this embodiment is about 20 msec, and the time taken to perform the power-up sequence is 100 microseconds (μsec). With this processing, the stop period of the image developing unit 220 becomes sufficiently longer than the power-up sequence time. Consequently, even if power supply to the image developing unit 220 is stopped, image display is never interrupted. Since the power consumption of the image developing unit 220 of this embodiment is higher than that of each of the remaining image processing units 221 to 223, it is possible to largely reduce the power consumption by stopping the power and clock during the stop period of the image developing unit 220. If the DRAM 211 is accessed in this procedure, the time taken for each of the image processing units 220 to 222 to complete processing of one frame at the time of image continuous shooting/recording becomes long. In the recording standby mode, however, the processing time of the image developing unit 220 is short, the size of one frame of image data to be processed is small, and thus it is not necessary to generate image data for recording. Therefore, even if each image processing unit is controlled to access the DRAM 211 in this procedure, it is possible to complete processing within the predetermined display time. Executing the above control makes it possible to optimally control power and a clock with a simple control arrangement, and reduce the power consumption.

Figure 6:
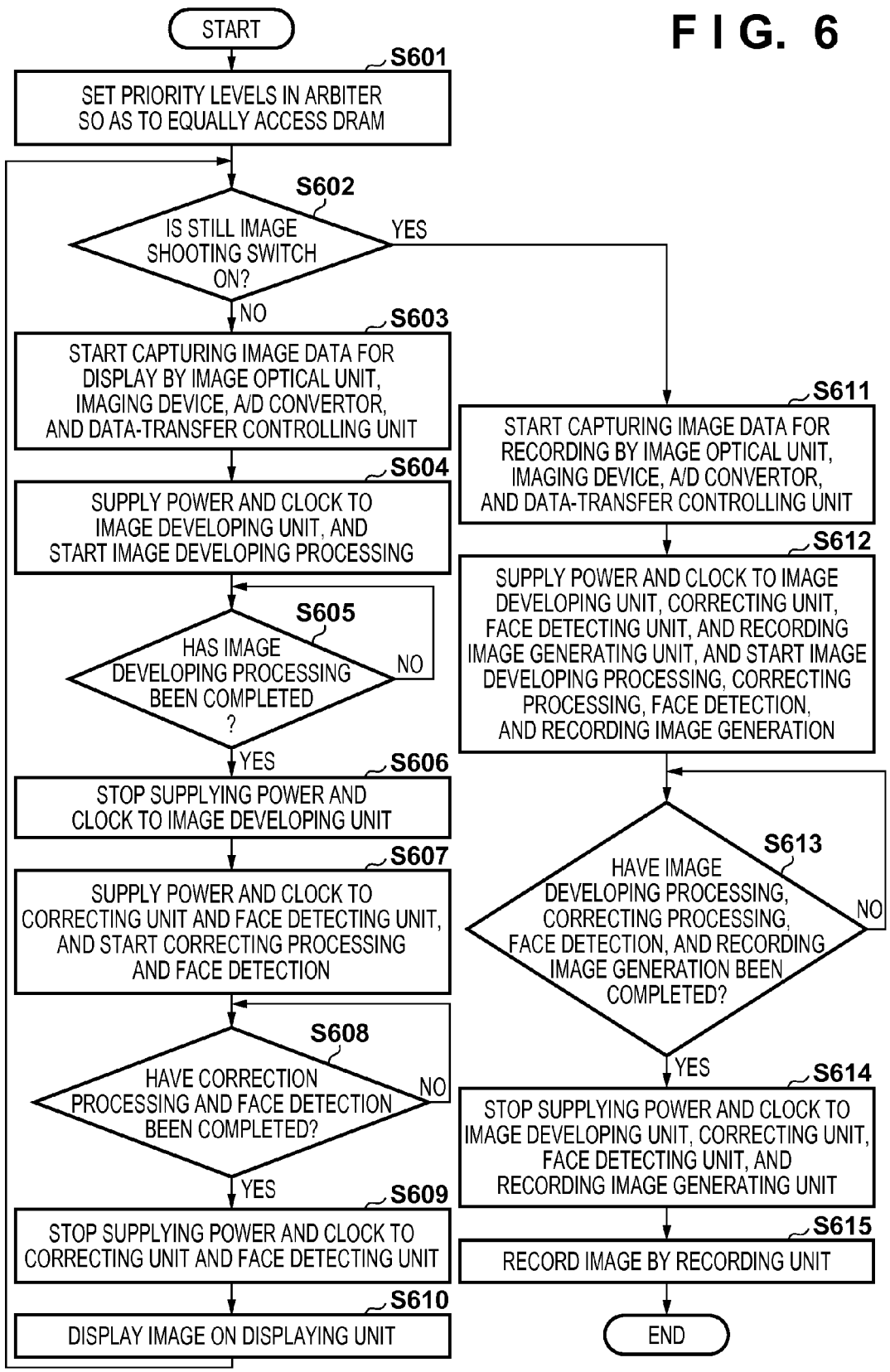
FIG. 6 is a flowchart illustrating an image display/recording processing procedure according to the first embodiment.

FIG. 6 shows image display/recording processing sequence according to this embodiment.

When the user operates an operating unit (not shown) to power on the image processing apparatus, the CPU 204 sets the image processing apparatus in the non-recording mode. Processing shown in FIG. 6 is then performed. The CPU 204 sets priority levels in the arbiter 301 of the data-transfer controlling unit 210 so as to allow the respective image processing units 220 to 223 to equally access the DRAM 211 (step S601). The CPU 204 determines whether the user has pressed a still image shooting switch (step S602). If the user has not pressed the switch, the CPU 204 performs the following processes (steps S603 to S610) to display image data on the displaying unit 205. The procedure of display processing in the non-recording mode will be described below. When the shooting switch is operated, the mode is switched from the non-recording mode to a recording mode.

The CPU 204 instructs the image optical unit 201, the imaging device 202, the A/D convertor 203, and the data-transfer controlling unit 210 to acquire image data for display (step S603). The CPU 204 instructs the power controlling unit 224 to supply power and a clock to the image developing unit 220, and instructs the image developing unit 220 to start image developing processing (step S604). On the other hand, the CPU 204 instructs the power controlling unit 224 to stop supplying the power and clock to the correcting unit 221, the face detecting unit 222 and the recording image generating unit 223. Upon completion of the image developing processing of one frame (step S605), the CPU 204 instructs the power controlling unit 224 to stop supplying the power and clock to the image developing unit 220 (step S606). The CPU 204 instructs the power controlling unit 224 to supply power and a clock to the correcting unit 221 and the face detecting unit 222, and instructs the correcting unit 221 and the face detecting unit 222 to start correcting processing and face detection, respectively (step S607). Upon completion of the correcting processing and face detection (step S608), the CPU 204 instructs the power controlling unit 224 to stop supplying the power and clock to the correcting unit 221 and the face detecting unit 222

(step S609). The CPU 204 instructs the displaying unit 205 to display a generated image (step S610).

On the other hand, processing (YES in step S602) when the CPU 204 determines that the user has pressed the shooting switch of the operating unit (not shown) to instruct recording of a still image is as follows.

The CPU 204 instructs the image optical unit 201, the imaging device 202, the A/D convertor 203, and the data-transfer controlling unit 210 to acquire image data for recording (step S611). In response to the acquisition instruction, the imaging device 202, the A/D convertor 203, and the data-transfer controlling unit 210 acquire image data (still image data) of one frame. The CPU 204 instructs the power controlling unit 224 to supply power and a clock to each of the image processing units 220 to 223, and instructs each of the image processing units 220 to 223 to start processing (step S612). Upon completion of the respective image processes (step S613), the CPU 204 instructs the power controlling unit 224 to stop supplying the power and clock to each of the image processing units 220 to 223 (step S614). The CPU 204 instructs the recording unit 206 to record a generated image (step S615).

As describe above, in the non-recording mode, during a period from when a predetermined one of a plurality of processing circuits, whose power consumption is high, starts processing of a predetermined data amount such as image data of one frame until the processing is completed, memory access by the remaining processing circuits is stopped. In the non-recording mode, processing is performed by concentrating memory access by a predetermined processing circuit. While the predetermined processing circuit does not access the memory, power supply and clock supply to the predetermined processing circuit are stopped. This control processing makes it possible to control power and clock supply to each image processing unit (processing circuit) with a simple control arrangement, thereby reducing the power consumption. This can process data at a high speed at the time of image recording, and complete image display processing within a predetermined time while suppressing the power consumption to be low at the time of image display in the non-recording mode, thereby increasing the data processing speed and reducing the power consumption at the same time.

Note that the four image processing units respectively perform image processes in this embodiment. However, the number of image processing units and is not limited to four, and need only be two or more.

In this embodiment, at the time of image display in the non-recording mode, the image developing unit 220 starts processing prior to the remaining processing circuits. The image developing unit 220 need not always start processing first, and any image processing unit capable of processing data at a high speed can start processing first. That is, the plurality of processing circuits which perform processes using the memory (the DRAM in this embodiment) are classified into the first group and the second group according to the magnitude of the power consumption. The first group constituted by processing circuits whose power consumption (data amount to be processed) is high performs processing in the first section 101 obtained by dividing the display frame interval into two sections, and power supply to the first group is stopped in the second section 102. In this embodiment, at the time of image display, processing of a low-speed image processing unit starts after completion of image processing which can be performed at a high speed. However, processing of a high-speed image processing unit may start after completion of low-speed image processing.

In this embodiment, at the time of image display, processing of a low-speed image processing unit starts after completion of processing of one high-speed image processing unit. However, a plurality of high-speed image processing units may exist, and processing of a low-speed image processing unit may start after processes by the high-speed image processing units are sequentially performed. Although a still image is recorded at the time of image recording in this embodiment, a moving image may be recorded. In this embodiment, processing of a low-speed image processing unit starts after completion of processing of one frame by a high-speed image processing unit. However, it is not always necessary to perform switching between the high-speed image processing and the low-speed image processing upon completion of image processing of one frame. In this embodiment, supply of power and a clock is stopped after completion of processing of a high-speed image processing unit. However, only supply of a clock may be stopped, and it is possible to reduce the power consumption by a simple control operation without mounting a complicated clock controlling circuit. The processing image size and predetermined time at the time of image display/recording need not be the same as those in this embodiment. Instead of completely stopping power supply to a high-speed image processing unit, power supplied while no processing is performed may be made lower than that supplied during execution of processing. Furthermore, instead of completely stopping clock supply to a high-speed image processing unit, the frequency of a clock supplied while no processing is performed may be made lower than that supplied during execution of processing.

Second Embodiment

The second embodiment will be described. The arrangement of an image processing apparatus, the DRAM access pattern of each image processing unit at the time of an independent operation, and the DRAM access pattern of each image processing unit at the time of image recording according to the second embodiment are the same as those in the aforementioned first embodiment, and a description thereof will be omitted.

In the second embodiment, the arrangement of a data-transfer controlling unit and a procedure of accessing a DRAM by each image processing unit at the time of image display are different from those in the first embodiment. In the first embodiment, in the non-recording mode, before completion of processing of one frame by the image developing unit 220, memory access by each of the remaining processing circuits is inhibited. Since, however, the delay time before an image read out from the imaging device 202 is displayed on the displaying unit 205 is desirably shorter, it is desirable to complete all image processes by the remaining processing units as quickly as possible at the time of image display. If, however, the same procedure as that at the time of image recording is used as an access procedure to the DRAM at the time of image display in the non-recording mode, the power consumption unwantedly increases. In the second embodiment, a procedure of accessing the DRAM by each processing unit is controlled so that all image processes are completed more quickly than in the first embodiment while suppressing the power consumption to be low at the time of image display in the non-recording mode.

FIG. 7 is a block diagram showing the arrangement of a data-transfer controlling unit 210 according to the second embodiment. The arrangement of RDDMACs 310 to 313, FIFOs 320 to 323 in the RDDMACs, WRDMACs 330 to 333, and FIFOs 340 to 343 in the WRDMACs is the same as that in the first embodiment. Reference numeral 701 denotes a FIFO data amount calculator which calculates a data amount stored in each of the FIFO 320 in the RDDMAC and the FIFO 340 in the WRDMAC, that are connected to an image developing unit 220. If an amount of the data stored in the FIFO 320 in the RDDMAC is sufficiently large, the RDDMAC 310 can output readout data to the image developing unit 220 without immediately reading out data from a DRAM 211, thereby preventing processing of the image developing unit 220 from being delayed. Alternatively, if an amount of the data stored in the FIFO 340 in the WRDMAC is sufficiently small, the WRDMAC 330 can receive write data output from the image developing unit 220 without immediately writing data in the DRAM 211, thereby preventing processing of the image developing unit 220 from being delayed.

A memory access controller 710 controls transfer of readout image data and write image data to the DRAM 211 in response to requests of the RDDMACs 310 to 313 and the WRDMACs 330 to 333. An arbiter 711 controls access priority levels when the RDDMACs 310 to 313 and the WRDMACs 330 to 333 simultaneously issue access requests to the DRAM 211. A CPU 204 sets, in the arbiter 711 of the second embodiment, a threshold for the amount of data stored in the FIFO 320 in the RDDMAC and a threshold for the amount of data stored in the FIFO 340 in the WRDMAC. At the time of image display in the non-recording mode, the arbiter 711 decides the priority level for accessing the DRAM 211 during the operation of the image developing unit 220 by comparing the amount of data output from the FIFO data amount calculator 701 with the threshold set by the CPU 204. More specifically, if the amount of data stored in the FIFO 320 in the RDDMAC is larger than the threshold, and the amount of data stored in the FIFO 340 in the WRDMAC is smaller than the threshold, access to the DRAM 211 by image processing units 221 and 222 other than the image developing unit 220 is permitted. This can cause each of the remaining image processing units 221 and 222 to perform processing when there is a small influence on the data processing speed of the image developing unit 220. In this embodiment, assume that the capacity of each of the FIFO 320 in the RDDMAC and the FIFO 340 in the WRDMAC is 512 bytes. Also, the data storage amount threshold of the FIFO 320 in the RDDMAC is 400 bytes, and the data storage amount threshold of the FIFO 340 in the WRDMAC is 100 bytes. After completion of the processing of the image developing unit 220, the correcting unit 221 and face detecting unit 222 are allowed to equally access the DRAM 211 regardless of the amounts of data stored in the FIFO 320 and 340. Note that at the time of image recording, the arbiter 711 allows all of the image processing units 220 to 222 and an image processing unit 223 to equally access the DRAM 211, similarly to the first embodiment.

Figure 8:
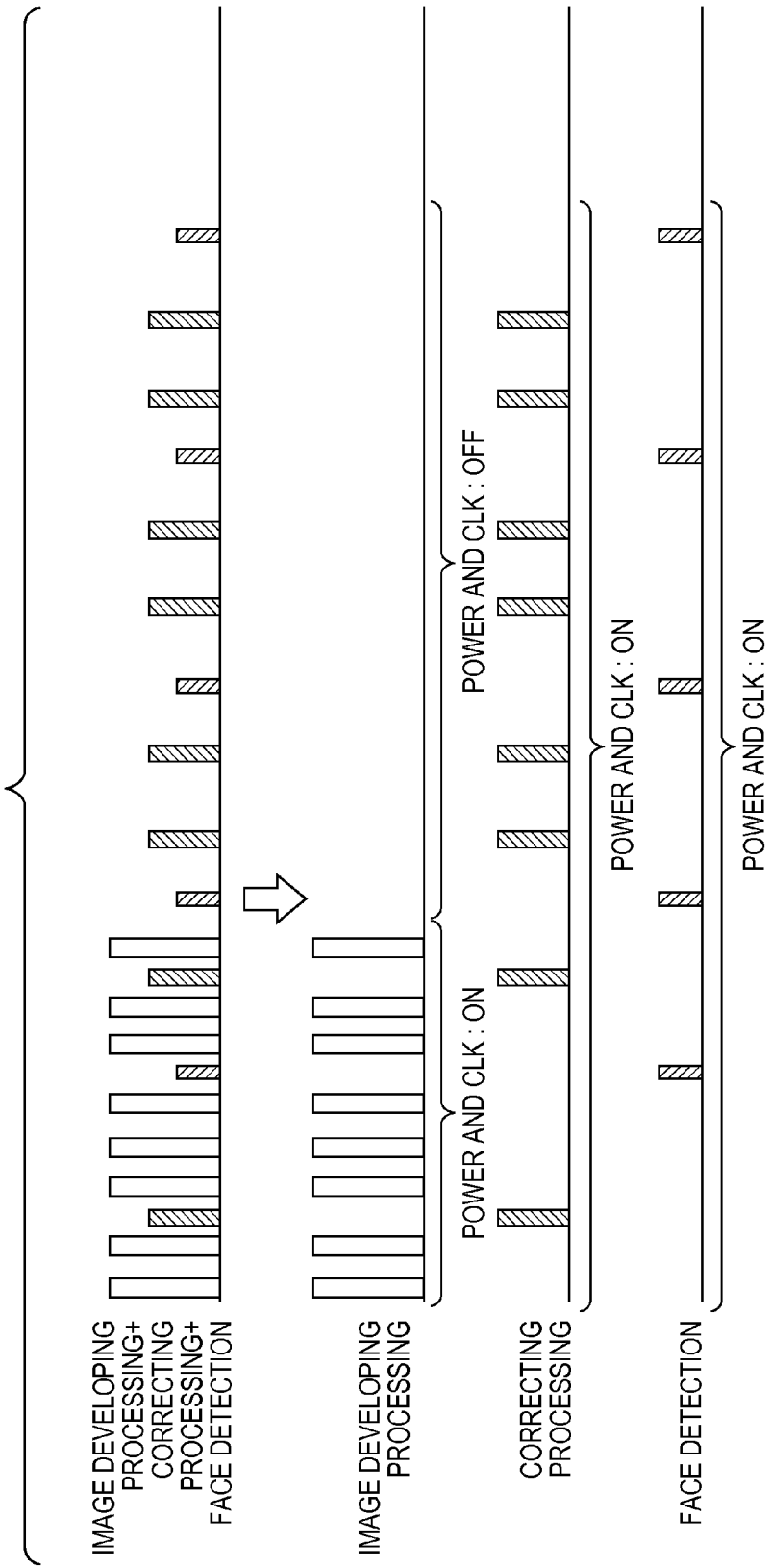
FIG. 8 is a view showing the DRAM access pattern of each image processing unit at the time of image display according to the second embodiment.

FIG. 8 is a view showing an access pattern to the DRAM 211 by each of the image processing units 220 to 222 when image data of one frame is processed and displayed on the displaying unit 205 in the image processing apparatus according to the second embodiment. At the time of image display in the non-recording mode, the CPU 204 starts processes of the image developing unit 220, correcting unit 221, and face detecting unit 222. At this time, the data storage amount threshold of the FIFO 320 in the RDDMAC and that of the FIFO 340 in the WRDMAC are set in the arbiter 711. If the arbiter 711 compares the amounts of data stored in the FIFO 320 and 340 with the data storage amount thresholds, respectively, and determines that there is a small influence on the data processing speed of the image developing unit 220, the correcting unit 221 and the face detecting unit 222 are permitted to access the DRAM 211. More specifically, if the amount of data stored in the FIFO 320 in the RDDMAC is larger than the threshold and the amount of data stored in the FIFO 340 in the WRDMAC is smaller than the threshold, the power and the clock is supplied to the image processing units 221 and 222 and the image processing units 221 and 222 other than the image developing unit 220 are permitted to access the DRAM 211. On the other hand, if the amount of data stored in the FIFO 320 in the RDDMAC is equal to or lower than the threshold or the amount of data stored in the FIFO 340 in the WRDMAC is equal to or larger than the threshold, the CPU 04 stops supplying the power and the clock to the image processing units 221 and 222. When the image developing unit 220 completes processing of image data of one frame, the CPU 204 stops supplying power and a clock to the image developing unit 220, and the correcting unit 221 and the face detecting unit 222 are allowed to equally access the DRAM 211 regardless of the FIFO data storage amounts.

With the above control processing, when there is a small influence on the data processing speed of the image developing unit 220, the remaining image processing units 221 and 222 can perform processes, and thus it is possible to shorten the time taken to complete all the processes of the image processing units while suppressing the power consumption to be low.

Figure 9:
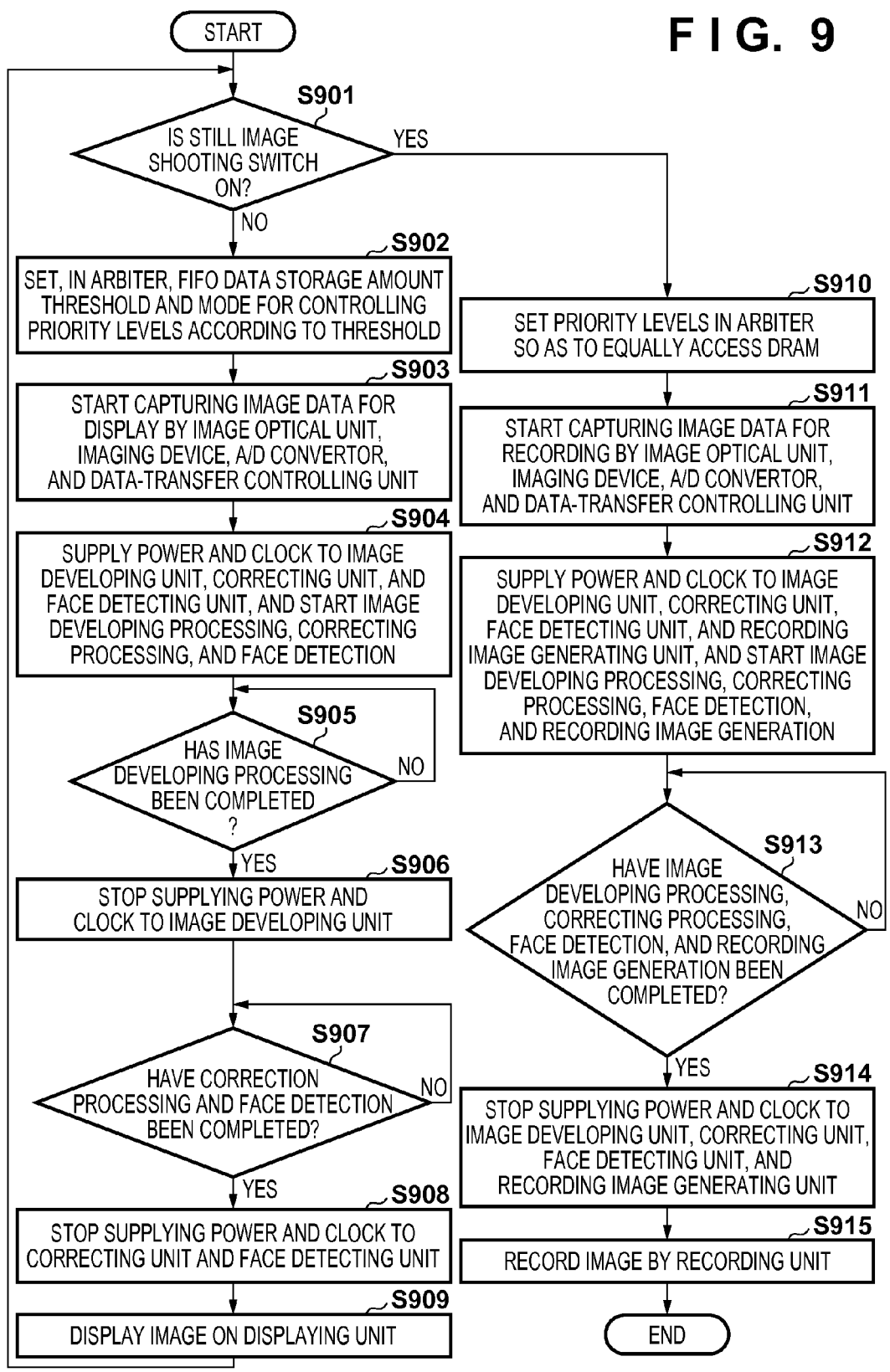
FIG. 9 is a flowchart illustrating an image display/recording processing procedure according to the second embodiment.

FIG. 9 shows an image display/recording sequence according to the second embodiment. The following description is based on FIG. 9.

The CPU 204 determines whether the user has pressed a still image shooting switch (step S901). If the user has not pressed the switch, the CPU 204 performs the following processes (steps S902 to S909) to display image data on the displaying unit 205. The CPU 204 sets, in the arbiter 711 of the data-transfer controlling unit 210, a FIFO data storage amount threshold, and a mode for deciding priority levels for accessing the DRAM 211 according to the set threshold (step S902). The CPU 204 instructs the image optical unit 201, the imaging device 202, the A/D convertor 203 and the data-transfer controlling unit 210 to capture an image for display (step S903). The CPU 204 instructs the power controlling unit 224 to supply power and a clock to the image developing unit 220, the correcting unit 221, and the face detecting unit 222. The CPU 204 also instructs each of the image developing unit 220, the correcting unit 221, and the face detecting unit 222 to start processing (step S904). Upon completion of the image developing processing (step S905), the CPU 204 instructs the power controlling unit 224 to stop supplying the power and clock to the image developing unit 220 (step S906). When the correcting processing and the face detecting processing end (step S907), the CPU 204 instructs the power controlling unit 224 to stop supplying the power and clock to the correcting unit 221 and the face detecting unit 222 (step S908). The CPU 204 instructs the displaying unit 205 to display a generated image (step S909).

Alternatively, if the CPU 204 determines that the user has pressed the still image shooting switch (YES in step S901), it performs the following processes (steps S910 to S916) to record image data in the recording unit 206.

The CPU 204 makes settings in the arbiter 711 of the data-transfer controlling unit 210 to allow the image processing units 220 to 223 to equally access the DRAM 211 (step S910). The CPU 204 instructs the image optical unit 201, the imaging device 202, the A/D convertor 203, and the data-transfer controlling unit 210 to capture an image for recording (step S911). The CPU 204 instructs the power controlling unit 224 to supply power and a clock to each of the image processing units 220 to 223, and instructs each of the image processing units 220 to 223 to start processing (step S912). Upon completion of the respective image processes (step S913), the CPU 204 instructs the power controlling unit 224 to stop supplying the power and clock to each of the image processing units 220 to 223 (step S914). The CPU 204 instructs the recording unit 206 to record a generated image (step S915).

As described above, in this embodiment, in the non-recording mode, the data amount in the memory accessed by processing circuits other than a predetermined processing circuit with high power consumption while the predetermined processing circuit processes image data of one frame is controlled to be smaller than the data amount in the recording mode. While the predetermined circuit does not access the memory, power supply and clock supply are stopped. The above control processing can shorten the processing completion times of all the image processing units, as compared with the first embodiment, while suppressing the power consumption at the time of image display.

Note that the four image processing units perform image processes in this embodiment. However, the number of image processing units is not limited to four, and need only be two or more. In this embodiment, at the time of image display, only the image developing unit 220 precedingly starts processing. However, the image developing unit 220 need not always precedingly start processing, and any image processing unit capable of processing data at a high speed can precedingly start processing. In this embodiment, at the time of image display, processing of a low-speed image processing unit starts in accordance with the FIFO data storage amount of one image processing unit. However, processing of a low-speed image processing unit may start in accordance with the FIFO data storage amounts of a plurality of image processing units. In this embodiment, at the time of image display, during processing of a high-speed image processing unit, other two image processing units are permitted to access the DRAM in accordance with the FIFO data storage amounts. However, the number of image processing units which are permitted to access the DRAM is not limited to two. In this embodiment, at the time of image display, the DRAM access priority levels are controlled according to the FIFO data storage amounts of both the RDDMAC and the WRDMAC but may be controlled according to one of the FIFO data storage amounts. Although a still image is recorded at the time of image recording in this embodiment, a moving image may be recorded. In this embodiment, supply of power and a clock is stopped after completion of processing of a high-speed image processing unit. However, only supply of a clock may be stopped, and it is possible to reduce the power consumption by a simple control operation without mounting a complicated clock controlling circuit. The processing image size and predetermined time at the time of image display/recording, and the FIFO capacities and FIFO data storage amount thresholds of the data-transfer controlling unit need not be the same as those in this embodiment.

Third Embodiment

The third embodiment will be described. In the third embodiment, the arrangement of an image processing apparatus, the DRAM access pattern of each image processing unit at the time of an independent operation, that at the time of image recording, and that at the time of image display according to the third embodiment are different from those in the first and second embodiments. In the third embodiment, the DRAM access patterns are controlled by a control method different from that in the second embodiment so that all image processes are completed more quickly than in the first embodiment while suppressing the power consumption to be low at the time of image display.

Figure 10:
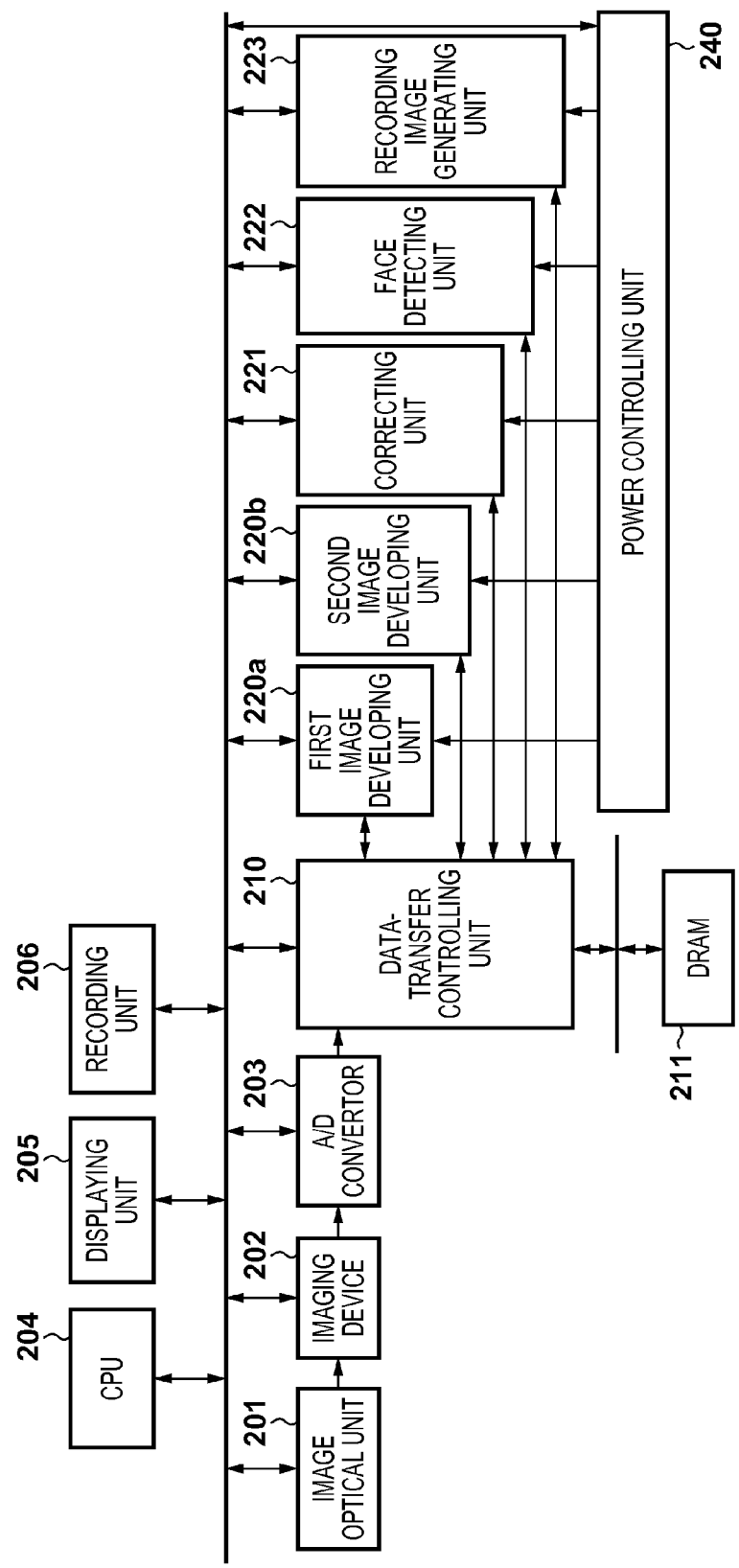
FIG. 10 is a block diagram showing the arrangement of an image processing apparatus according to the third embodiment.

FIG. 10 is a block diagram showing the arrangement of an image processing apparatus according to the third embodiment. In the third embodiment, the difference from the aforementioned first and second embodiments is that a first image developing unit 220a and a second image developing unit 220b exist as image developing units. Each of the first image developing unit 220a and the second image developing unit 220b writes, in the DRAM 211, the result of reading out image data from a DRAM 211 and performing image processing. The second image developing unit 220b performs image processing for the result of performing image processing by the first image developing unit 220a, and writes the processing result in the DRAM 211. Reference numeral 240 denotes a power controlling unit which controls supply of a clock and power to the respective processing units 220a and 220b and image processing units 221 to 223 in accordance with an instruction of a CPU 204, and is configured to independently control supply of a clock and power to each of the image processing units 220a, 220b, and 221 to 223. The components of the image processing apparatuses other than the first image developing unit 220a, the second image developing unit 220b, and the power controlling unit 240 are the same as those in the first embodiment.

FIG. 11 is a view showing the access time and data amount of the DRAM 211 when each of the image processing units 220a, 220b, and 221 to 223 independently processes image data of one frame according to the third embodiment. In this embodiment, each of the first image developing unit 220a and the second image developing unit 220b processes a large amount data at a high speed, and its power consumption is also high, as compared with the remaining image processing units. By comparing the first image developing unit 220a with the second image developing unit 220b, it is found that the first image developing unit 220a processes a large amount of data at a higher speed and its power consumption is also higher. In the third embodiment, the average memory use bands of the DRAM 211 of the respective image processing units 220a, 220b, and 221 to 223 are unique, that is, 25%, 20%, 15%, 5%, and 7%. The average memory use band is a value calculated as a ratio of an average data speed [MB/sec] processed by each of the image processing units 220a, 220b, and 221 to 223 to the maximum data speed [MB/sec] transferable to the DRAM 211.

FIG. 12 is a view showing the access pattern of the DRAM 211 of each of the image processing units 220a, 220b, and 221 to 223 when image data of one frame is processed and recorded in a recording unit 206 at the time of still image continuous shooting/recording of the image processing apparatus according to the third embodiment. In the third embodiment, the difference from the first and second embodiments is that the first image developing unit 220a and the second image developing unit 220b access the DRAM 211. A control method and the like are the same as those in the first embodiment, and access priority levels are set in an arbiter 301 so that all processes equally access the DRAM 211 so as to complete all the processes within the predetermined continuous shooting time.

FIG. 13 is a view showing the access pattern of the DRAM 211 of each of the image processing units 220a, 220b, 221, and 222 when image data of one frame is processed and displayed on a displaying unit 205 in the non-recording state of the image processing apparatus according to the third embodiment. In general, when the use band of the DRAM is narrow, that is, when the data amount accessed by the DRAM per unit time is small, each circuit which accesses the DRAM can operate at a processing speed close to that at the time of an independent operation. On the other hand, when the use band of the DRAM is wide, each circuit often needs to stand by for completion of access by another circuit, and the processing speed of each circuit becomes low. Therefore, in this embodiment, if the use band of the DRAM 211 is equal to or narrower than a given value at the time of the operation of a high-speed image processing unit, a low-speed image processing unit is permitted to access the DRAM 211. The adverse influence on the processing speed of a high-speed image processing unit when another processing unit accesses the DRAM 211 is made small by limiting the use band of the DRAM 211 to be equal to or narrower than the given value. In the third embodiment, the tolerance use band of the DRAM 211 at the time of the operation of a high-speed image processing unit is 50%, and the total use band of the processing units is limited to be equal to or narrower than the tolerance use band. The use band of the DRAM 211 at the time of simultaneous operation of the first image developing unit 220a and the second image developing unit 220b as high-speed image processing units of this embodiment is 45% (=25%+20%). Since the use band of the DRAM 211 is 50% (=25%+20%+5%) even if the face detecting unit 222 is simultaneously operated, the first image developing unit 220a, the second image developing unit 220b, and the face detecting unit 222 are simultaneously operated in this embodiment. Upon completion of processing of the first image developing unit 220a, supply of power and a clock to the first image developing unit 220a is stopped. After the completion of the processing of the first image developing unit 220a, the use band of the DRAM 211 is 25% (20%+5%). Therefore, since the use band of the DRAM 211 is 40% (=20%+5%+15%) even if the correcting unit 221 is operated, the operation of the correcting unit 221 starts. Upon completion of processing of the second image developing unit 220b, supply of power and a clock to the second image developing unit 220b is stopped. Upon completion of processing of the face detecting unit 222, supply of power and a clock to the face detecting unit 222 is stopped. As described above, in this embodiment, the other processing units are permitted to access the memory in addition to the first image developing unit 220a and the second image developing unit 220b so as to prevent the use band of the memory from exceeding a predetermined value. Since performing such control processing makes it possible to operate a low-speed image processing unit while suppressing the adverse influence on the processing speed of a high-speed image processing unit, the processing completion times of all the image processes can be shortened. Since the power consumptions of the first image developing unit 220a and the second image developing unit 220b as high-speed image processing units of this embodiment are high, it is possible to suppress the power consumptions to be low by completing the processes of the high-speed image processing unit quickly, and stopping supply of power and a clock.

Figure 14B:
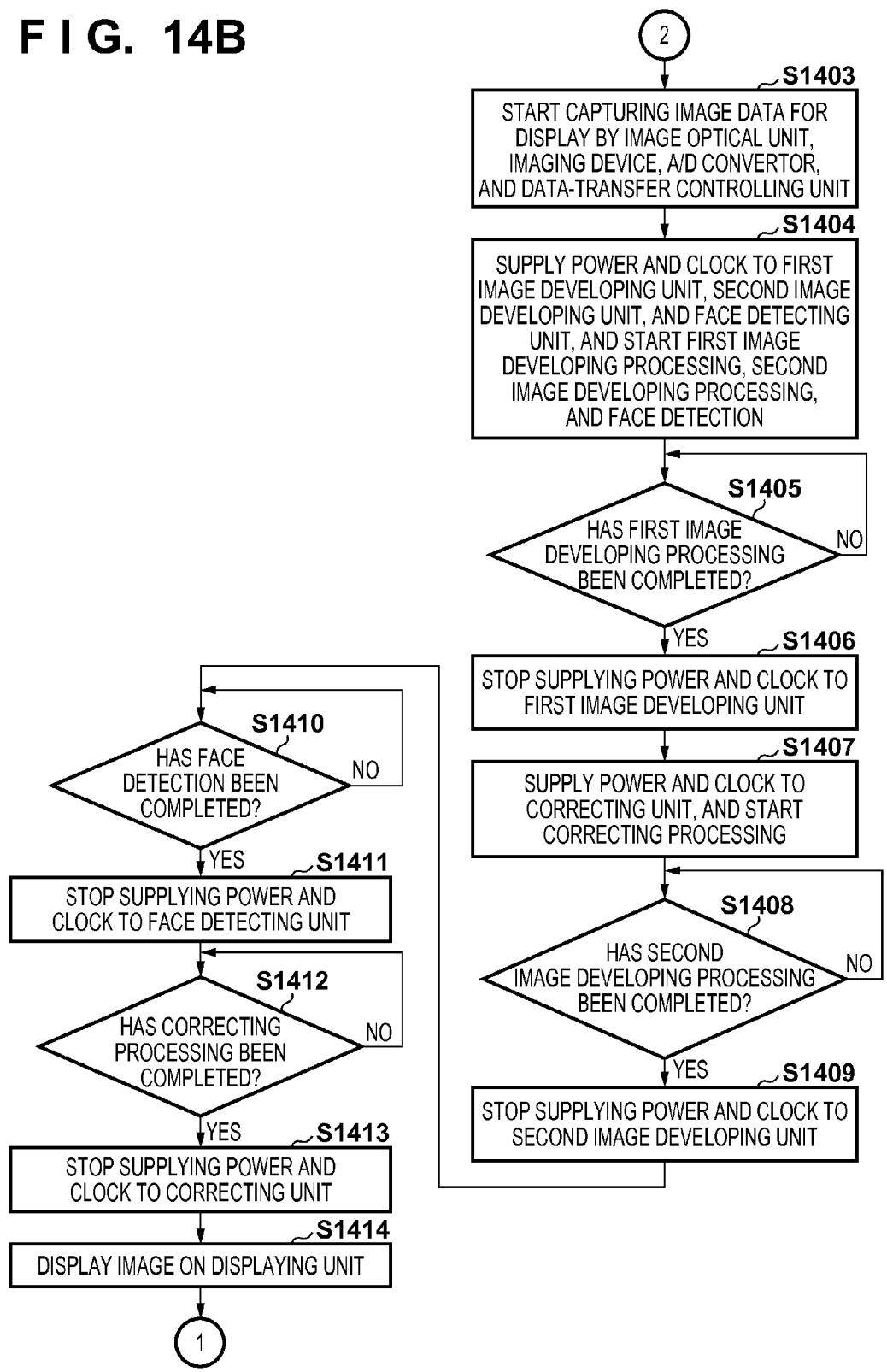

FIGS. 14A and 14B show an image display/recording sequence according to the third embodiment.

The CPU 204 sets priority levels in the arbiter 301 of a data-transfer controlling unit 210 so as to allow the image processing units 220a, 220b, and 221 to 223 to equally access the DRAM 211 (step S1401). The CPU 204 determines whether the user has pressed a still image shooting switch (step S1402). If the user has not pressed the switch, the CPU 204 performs the following processes (steps S1403 to S1414) to display image data on the displaying unit 205.

The CPU 204 instructs an image optical unit 201, an imaging device 202, an A/D convertor 203, and the data-transfer controlling unit 210 to capture an image for display (step S1403). The CPU 204 instructs the power controlling unit 240 to supply power and a clock to the first image developing unit 220a, the second image developing unit 220b, and the face detecting unit 222, and instructs each of the first image developing unit 220a, the second image developing unit 220b, and the face detecting unit 222 to start processing (step S1404). Upon completion of the first image developing processing (step S1405), the CPU 204 instructs the power controlling unit 240 to stop supplying the power and clock to the first image developing unit 220a (step S1406). The CPU 204 instructs the power controlling unit 240 to supply power and a clock to the correcting unit 221, and instructs the correcting unit 221 to start processing (step S1407). Upon completion of the second image developing processing (step S1408), the CPU 204 instructs the power controlling unit 240 to stop supplying the power and clock to the second image developing unit 220b (step S1409). Upon completion of face detection (step S1410), the CPU 204 instructs the power controlling unit 240 to stop supplying the power and clock to the face detecting unit 222 (step S1411). Upon completion of correcting processing (step S1412), the CPU 204 instructs the power controlling unit 240 to stop supplying the power and clock to the correcting unit 221 (step S1413). The CPU 204 instructs the displaying unit 205 to display a generated image (step S1414).

On the other hand, if the CPU 204 determines in step S1402 that the user has pressed the still image shooting switch, it performs the following processes (steps S1415 to S1419) to record image data in the recording unit 206.

The CPU 204 instructs the image optical unit 201, the imaging device 202, the A/D convertor 203, and the data-transfer controlling unit 210 to capture an image for recording (step S1415). The CPU 204 instructs the power controlling unit 240 to supply power and a clock to each of the image processing units 220a, 220b, and 221 to 223, and instructs each of the image processing units 220a, 220b, and 221 to 223 to start processing (step S1416). Upon completion of the respective image processes (step S1417), the CPU 204 instructs the power controlling unit 240 to stop supplying the power and clock to each of the image processing units 220a, 220b, and 221 to 223 (step S1418). The CPU 204 instructs the recording unit 206 to record a generated image (step S1419).

As described above, it is possible to make the processing completion times of all image processing units shorter than those in the first embodiment while suppressing the power consumption to be low at the time of image display by executing control processing according this embodiment.

Note that the five image processing units perform image processes in this embodiment. However, the present invention is not limited to five. In this embodiment, at the time of image display, the first image developing unit 220a and the second image developing unit 220b precedingly start processes. However, the first image developing unit 220a and the second image developing unit 220b need not always precedingly start processes, and any image processing unit capable of processing data at a high speed can precedingly start processing. In this embodiment, at the time of image display, processing of a low-speed image processing unit starts after the start of processing of a high-speed image processing unit. However, processing of a high-speed image processing unit may start after the start of processing of a low-speed image processing unit. Although a still image is recorded at the time of image recording in this embodiment, a moving image may be recorded. In this embodiment, supply of power and a clock is stopped after completion of processing of a high-speed image processing unit. However, only supply of a clock may be stopped, and it is possible to reduce the power consumption by a simple control operation without mounting a complicated clock controlling circuit. The processing image size and predetermined time at the time of image display/recording, and the limited band used by the DRAM need not be the same as those in this embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-268085, filed Dec. 25, 2013, which is hereby incorporated by reference herein in its entirety.

What is claimed is:

1. An imaging apparatus comprising:
a DRAM;
a plurality of image processing units each configured to process image data corresponding to a plurality of image frames, and access the DRAM;
a recording unit configured to record the image data processed by the image processing units in a recording medium,
wherein the imaging apparatus has a plurality of modes including a first mode in which images associated with the plurality of image frames processed by the plurality of image processing units are displayed by a display device without recording the image data processed by the image processing units by the recording unit, and a second mode in which the recording unit records the image data processed by the image processing units,
wherein the plurality of image processing units respectively access the DRAM in the first mode and the second mode;
a data transfer controlling unit configured to control data transfer to the DRAM;
a power controlling unit configured to control power consumptions of the plurality of image processing units; and
a CPU configured to control the data transfer controlling unit and the power controlling unit in accordance with a current mode among the plurality of modes of the imaging apparatus,
wherein the CPU controls the data transfer controlling unit, in accordance with the current mode of the imaging apparatus, to control a data amount accessed to the DRAM by remaining image processing units other than a predetermined one image processing unit of the plurality of image processing units while the predetermined one image processing unit processes a predetermined amount of image data,
wherein the CPU controls the data transfer controlling unit so that a data amount accessed to the DRAM by the remaining image processing units while the predetermined one image processing unit processes the predetermined amount of image data in the first mode is smaller than a data amount accessed to the DRAM by the remaining image processing units while the predetermined one image processing unit processes the predetermined amount of image data in the second mode, and
wherein the CPU controls the power controlling unit so that, in the first mode, power consumption of the predetermined one image processing unit after the predetermined one image processing unit ends the processing of the predetermined amount of image data is lower than power consumption of the predetermined one image processing unit while the predetermined one image processing unit processes the predetermined amount of image data.

2. The apparatus according to claim 1, wherein in the first mode, the power controlling unit stops power supply to the predetermined one image processing unit after the predetermined one image processing unit ends the processing of the predetermined amount of image data until the processing of the predetermined amount of image data starts next.

3. The apparatus according to claim 1, wherein in the first mode, the power controlling unit stops supply of an operation clock to the predetermined one image processing unit after the predetermined one image processing unit ends the processing of the predetermined amount of image data until the processing of the predetermined amount of image data starts next.

4. The apparatus according to claim 1, wherein in the first mode, the data transfer controlling unit controls access to the DRAM by the remaining image processing units so as to prevent a use band of the DRAM from exceeding a predetermined value from a start to completion of the processing of the predetermined amount of image data by the predetermined one image processing unit.

5. The apparatus according to claim 1, wherein the data transfer controlling unit includes a FIFO configured to store data transferred between said plurality of image processing units and the DRAM, and controls access to the DRAM by the remaining image processing units based on a data amount of image data stored in the FIFO for the predetermined one image processing unit.

6. The apparatus according to claim 1, wherein the predetermined one image processing unit operates at a speed higher than those of the remaining image processing units, and power consumption of the predetermined one image processing unit is higher than those of the remaining image processing units.

7. The apparatus according to claim 1, further comprising:
an imaging device,
wherein one of the plurality of image processing units processes image data output from the imaging device.

8. The apparatus according to claim 1, wherein in the first mode, the predetermined one image processing unit processes image data of n frames for one sec.

9. A control method of an imaging apparatus which comprises
a DRAM,
a plurality of image processing units each configured to process image data corresponding to a plurality of image frames, and access the DRAM,
a recording unit configured to record the image data processed by the image processing units in a recording medium,
wherein the imaging apparatus has a plurality of modes including a first mode in which images associated with the plurality of image frames processed by the plurality of image processing units are displayed by a display device without recording the image data processed by the image processing units by the recording unit, and a second mode in which the recording unit records the image data processed by the image processing units,
wherein the plurality of image processing units respectively access the DRAM in the first mode and the second mode,
a data transfer controlling unit configured to control data transfer to the DRAM,
a power controlling unit configured to control power consumptions of the plurality of image processing units, and
a CPU configured to control the data transfer controlling unit and the power controlling unit in accordance with a current mode among the plurality of modes of the imaging apparatus,
said method comprising:
controlling the data transfer controlling unit, in accordance with the current mode of the imaging apparatus to control a data amount accessed to the DRAM by remaining image processing units other than a predetermined one image processing unit of the plurality of image processing units while the predetermined one image processing unit processes a predetermined amount of image data,
wherein the controlling step controls the data transfer controlling unit so that a data amount accessed to the DRAM by the remaining image processing units while the predetermined one image processing unit processes the predetermined amount of image data in the first mode is smaller than a data amount accessed to the DRAM by the remaining image processing units while the predetermined one image processing unit processes the predetermined amount of image data in the second mode, and
wherein the controlling step controls the power controlling unit so that, in the first mode, power consumption of the predetermined one image processing unit after the predetermined one image processing unit ends the processing of the predetermined amount of image data is lower than power consumption of the predetermined one image processing unit while the predetermined one image processing unit processes the predetermined amount of image data.

10. An imaging apparatus comprising:
a DRAM;
a plurality of image processing units each configured to process image data corresponding to a plurality of image frames, and access the DRAM;
a recording unit configured to record the image data processed by the image processing units in a recording medium,
wherein the imaging apparatus has a plurality of modes including a first mode in which images associated with the plurality of image frames processed by the plurality of image processing units are displayed by a display device without recording the image data processed by the image processing units by said recording unit, and a second mode in which the recording unit records the image data processed by the image processing units;
a data transfer controlling unit configured to control data transfer to the DRAM;
a power controlling unit configured to control power consumptions of the plurality of image processing units; and
a CPU configured to control the data transfer controlling unit and the power control unit in accordance with a current mode among the plurality of modes of the imaging apparatus,
wherein the CPU controls the data transfer controlling unit so that, in the first mode, remaining image processing units other than a predetermined one image processing unit of said plurality of image processing units is permitted to access the DRAM during a period from a start to end of processing of image data of one frame of the plurality of image frames by the predetermined one image processing unit, if a use band of the DRAM is equal to or lower than a predetermined value, and
wherein the CPU controls the power controlling unit to perform a control such that the predetermined one image processing unit becomes a low power consumption state in a period from when the predetermined one image processing unit ends the processing of the image data of the one frame of the plurality of frames until processing of a next frame is performed in the first mode.

11. The apparatus according to claim 10, wherein an image processing unit permitted to access the DRAM during the period from the start to end of processing of image data of one frame by the predetermined one image processing unit is selected from the remaining image processing units in the first mode such that the use band of the DRAM is equal to or lower than the predetermined value during the period from the start to end of processing of image data of one frame by the predetermined one image processing unit.

12. The apparatus according to claim 11, wherein the data transfer controlling unit permits an image processing unit different from the selected image processing unit among the remaining image processing units to access the DRAM in the period from when the predetermined one image processing unit ends the processing of the image data of the one frame until processing of a next frame is performed in the first mode.

* * * * *